United States Patent [19]

Aykanian

[11] 4,216,801
[45] Aug. 12, 1980

[54] FLEXIBLE TUBE

[75] Inventor: Ardashus A. Aykanian, Wilbraham, Mass.

[73] Assignee: Flexible Plastic Straw Corporation, Ludlow, Mass.

[21] Appl. No.: 31,929

[22] Filed: Apr. 20, 1979

Related U.S. Application Data

[63] Continuation of Ser. No. 718,176, Aug. 27, 1976, abandoned.

[51] Int. Cl.³ .................... F16L 11/06; A47G 19/22
[52] U.S. Cl. ................................ 138/121; 239/33; 229/7 S
[58] Field of Search ......... 138/121, 122, 119, DIG. 8, 138/172; 239/33, 16, 24; 215/1 A; 206/47 B; 229/7 S

[56] References Cited

U.S. PATENT DOCUMENTS

| | | | |
|---|---|---|---|
| 2,582,249 | 1/1952 | Hendel | 138/121 X |
| 2,822,194 | 2/1958 | Fentress | 138/121 |
| 2,876,801 | 3/1959 | November | 138/121 |
| 3,324,895 | 6/1967 | Johnson | 138/121 |
| 3,326,695 | 6/1967 | Neuhauser | 215/1 A X |
| 3,343,567 | 9/1967 | Mulligan | 138/119 |
| 3,346,187 | 10/1967 | Mueller | 239/33 |
| 3,409,224 | 11/1968 | Harp et al. | 239/33 |
| 3,721,269 | 3/1973 | Choate | 138/119 |
| 3,738,394 | 6/1973 | Westerbarkey | 138/122 |
| 3,780,944 | 12/1973 | Zubalik | 229/7 S X |
| 3,929,165 | 12/1975 | Diebolt et al. | 138/121 |

FOREIGN PATENT DOCUMENTS

| | | | |
|---|---|---|---|
| 522825 | 10/1953 | Belgium | 138/122 |
| 2012424 | 10/1971 | Fed. Rep. of Germany | 138/121 |

Primary Examiner—Richard E. Aegerter
Assistant Examiner—James E. Bryant, III
Attorney, Agent, or Firm—Birch, Stewart, Kolasch & Birch

[57] ABSTRACT

A tube of thermoplastic material having a flexible zone intermediate the ends thereof which may be flexed without substantial springback. The flexible zone comprises a series of circumferential grooves having an annular floor from which two opposed groove sides convergently extend.

8 Claims, 5 Drawing Figures

FLEXIBLE TUBE

This application is a continuation, of copending application Ser. No. 718,176, filed on Aug. 27, 1976 now abandoned.

BACKGROUND OF THE INVENTION

This invention relates generally to flexible tubes, and particularly to flexible tubes of the type having limited springback tendencies.

Flexible tubing made of rubber and cloth has been in existence for many years. Early attempts at improving their flexibility without an accompanying degradation in strength were directed at providing corrugations as exemplified by that disclosed in U.S. Pat. No. 314,440. Later, corrugations were formed in drinking tubes or straws to increase their flexibility as shown in U.S. Pat. No. 2,094,268.

Early tubular corrugations typically took a helical configuration. More recently, however, with the advent of thermoplastic materials, new configurations in corrugations have been made in an effort to simplify manufacture. For example, discontinuous grooves have been provided in flexible sections of thermoplastic drinking tubes as disclosed by U.S. Pat. No. 3,438,578. The material thickness in area of corrugations has also been varied to improve axial and radial flexibility as shown by U.S. Pat. No. 3,346,187.

Though the just described corrugated tubes have had good flexibility and strength, they have, by and large, been characterized by a high degree of resilience. Thus, once flexed or bent they have tended to reassume their originally constructed configuration unless held bent by ancillary holding means. In many situations, however, it is desirable to have the flexible tubing exhibit minimum springback tendencies once bent from its original configuration and thereby retain its bent configuration. Recently, new corrugations have been devised in efforts to overcome this problem of springback in drinking tubes as disclosed in U.S. Pat. Nos. 3,409,224, 3,445,552, and 3,908,704. The corrugations here are formed at skewed angles with the tube axes and with each corrugation defined by a groove having sides of unequal lengths. These unequal sides are joined together at the base of each groove at either a sharp angle therewith or with a close U-shape bend. The outside edges or ridges of corrugations have similar degrees of surface sharpness or roughness.

Though the just described flexible tubes have functioned relatively well, they have not been without disadvantages. For example, though a drinking tube or straw may incorporate only a relatively small flexible zone of the type described in an otherwise smooth tube, the ruffled outside edges of the corrugations have tended to impede their packaging into encapsulating paper covers. The straws are ordinarily sealed within paper jackets or covers by wrapping machines. The ruffled straw edges have caused excessively high rates of crinkling and jamming of the covers during machines wrapping operations to occur. In addition, to effect a bend of a given angle a predetermined number of grooves is required, which number has heretofore been rather large. The ruffled, peripheral surface of the flexible zone has also caused the drinking tubes or straws to become mutually interlocked rendering it difficult to process them during automatic packaging operations. Furthermore, when stored in hoppers these corrugations have also tended to reduce the degree of compactness with which large number of straws may be stored or processed.

Accordingly, it is a general object of the present invention to provide an improved flexible tube.

More specifically, it an object of the invention to provide an improved flexible tube of the type capable of retaining a bent configuration without appreciable springback tendency.

Another object of the invention is to provide a flexible tube of the type described having relatively smooth interior and exterior surfaces.

Another object of the invention is to provide a flexible tube of the type described requiring a relatively few number of circumferential grooves for effecting bends of selected angles.

Another object of the invention is to provide a flexible tube of the type described having minimal tendency to interlock with other tubes of the same configuration when stored in mutual abutment.

Yet another object of the invention is to provide a flexible tube of the type described capable of being stored in mass with an improved degree of compactness.

SUMMARY OF THE INVENTION

In one form of the invention a tube of thermoplastic material is provided having a flexible zone intermediate to the ends thereof which may be flexed without substantial springback. The flexible zone comprises a series of circumferential grooves with each groove having an annular floor from which two opposed groove sides convergently extend.

In another form of the invention a tube is provided having a flexible zone of low springback tendencies formed with a plurality of circumferential grooves having annular floors to which conical sides are joined at acute angles in forming toggle joints.

DESCRIPTION OF THE PREFERRED EMBODIMENT

Figure 1:
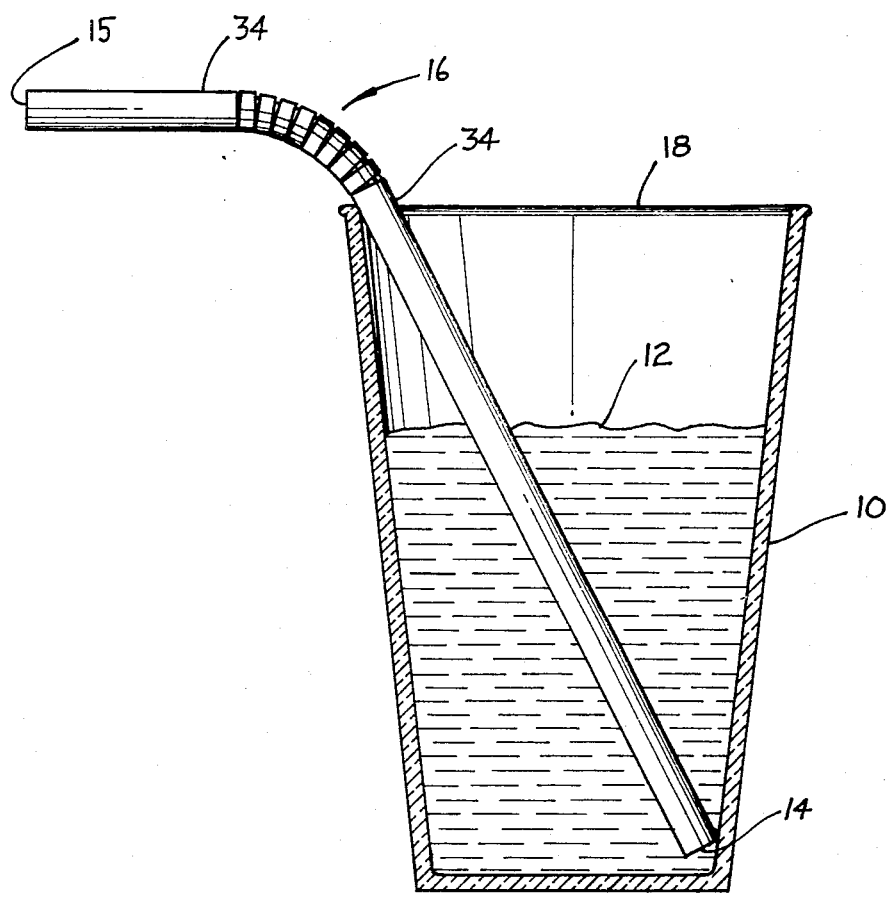
FIG. 1 is a side elevational view of a flexible tube embodying principles of the present invention shown positioned in a bent configuration in an open-topped cup or vessel containing a liquid.
Figure 4:
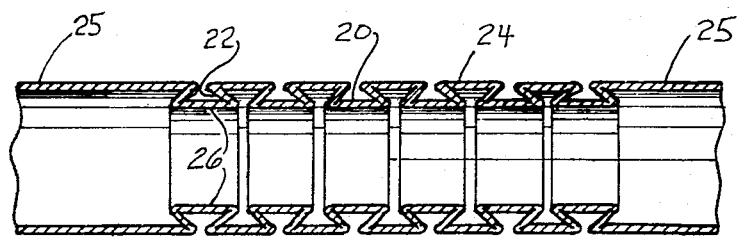
FIG. 4 is a cross-sectional view of the flexible zone of the tube shown in FIG. 1 in a latter stage of tube fabrication.

Referring now in more detail to the drawing, there is shown in FIG. 1 a flexible, drinking tube or straw positioned within an open topped cup 10 in which a body of liquid 12 is contained. The drinking tube or straw is shown disposed within the cup with its lower end 14 positioned adjacent the inside bottom of the cup and with its upper end 15 located outside the cup where it is accessible to the lips and mouth of a person for drinking the fluid 12 from the cup through the straw. The tube is seen to be bent at a flexible zone or portion 16 intermediate two straight zones 34 and the tube ends 14 and 15 where it rests against and overhangs the annular cup lip 18. This flexible zone is shown in FIG. 4 to comprise a plurality of circumferential grooves of truncated-triangular cross-sectional configuration having annular, circular floors 20 from which two conical sides 22 convergently extend. Each of the two sides is of substantially the same size and configuration, being somewhat shorter axially than that of the annular floor. So formed, annular peripheral bands 24 linking adjacent grooves together have substantially the same outside diameter as that of the adjacent smooth sections 25 of the tube which straddle the flexible zone.

It will also be seen that the inner surfaces 26 of the groove floors 20 are annular and smooth and that the thickness of the material throughout the flexible zone is substantially uniform. The peripheral surfaces of the flexible zone are also relatively smooth and unruffled. As a result, tubes incorporating this flexible zone may be readily packaged into encapsulating paper or the like without jamming. Furthermore, they may be stored in hoppers in relatively compact configurations with minimal tendency to interlock with grooves of adjacent tubes.

Flexible tubes of the type embodying a flexible zone of the type just described may be made from numerous materials including various metals and plastics. When used as a drinking tube or straw as shown in FIG. 1, the material is preferably thermoplastic such as polypropylene of some 6 to 8 mils uniform thickness throughout the tube, including that of the flexible zone. The flexible zone itself may be formed by rolling the thermoplastic material onto a spindle and guide in a manner similar to that disclosed in U.S. Pat. No. 3,493,998, which patent is assigned to the assignee of the present application.

Figure 3:
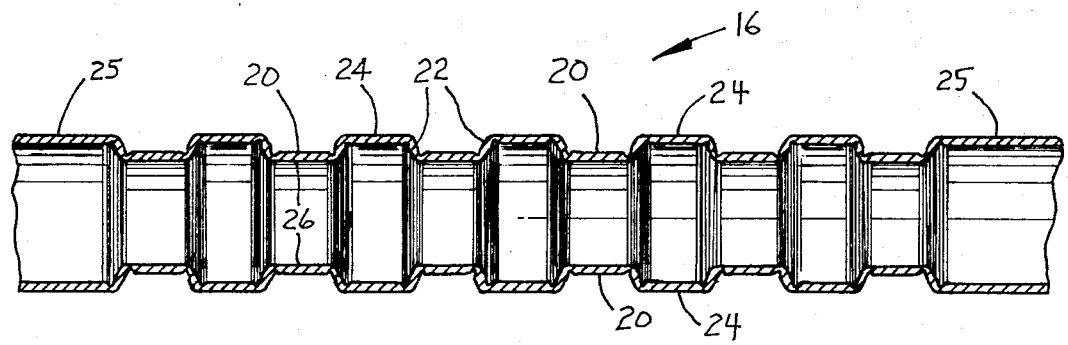
FIG. 3 is a cross-sectional view of the flexible zone of the tube shown in FIG. 1 in an early stage of tube fabrication.

During formation the grooves are formed with walls 22 initially diverging from the groove floors 20 as shown in FIG. 3. Annular areas 27 of reduced thickness are also provided at the junctions of less than 180° of the groove sides with groove floors 20 and bands 24, which provide pivot points. Preferably, the wall thickness of these areas is between one half and three fourths that of the adjacent wall thickness. Thus, where the straw wall thickness is approximately 8 mils, the reduced thickness portions may be approximately 5 mils thick. Wall thinning is accomplished by providing staggered ridges on the confronting surfaces of the formation machinery spindle and die.

After the flexible zone has been so formed it is axially contracted. This action causes the side walls 22 to be forced with snap-like actions from their mutually divergent orientation of FIG. 3 to their mutually convergent orientation as shown in FIG. 4. This snap-like action results from the junctions of the groove sides with the floors and interconnecting bands functioning as toggle joints.

Figure 2:
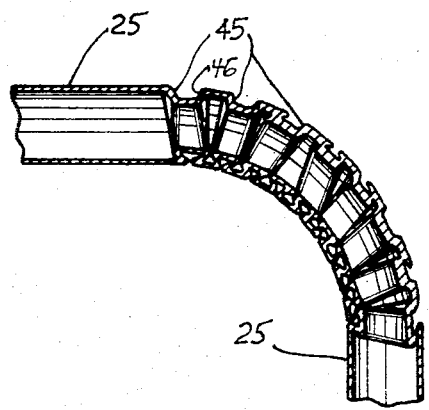
FIG. 2 is a side view, in cross-section, of the bent flexible zone of the tube shown in FIG. 1.
Figure 5:
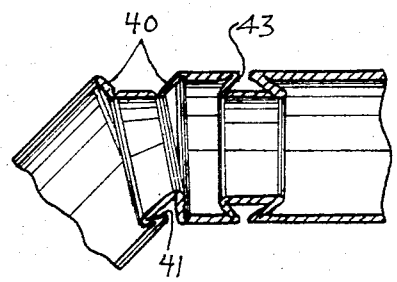
FIG. 5 is a cross-sectional view of a flexible zone of a flexible tube illustrating one corrugation groove bent and one unbent.

After the tube has been removed from the forming machines it may be flexed to a bent position and thereafter retain such configuration. During this operation individual groove walls on the outside of the bend snap, often in a random fashion, from mutually convergent to divergent configurations. In FIG. 5, for example, the outside wall portions of groove walls 40 have so snapped while their inside curved portion 41 have retained their mutually convergent orientation. Additional flexing of the tube causes groove walls 43 also to snap with toggle-like action to an open, mutually divergent configuration. In other cases, as shown in FIG. 2, the snap action of the groove walls along the convex side of the bent flexible zone is random. Here, for example, it is seen that groove walls 45 have snapped open while walls 46 have not. It thus is difficult to predict the exact order of the progression of toggle action.

We thus see that a flexible tube is provided of the type having minimal spring-back tendencies which has a substantially smooth and unruffled peripheral surface that may be easily packaged with minimal tendency to crinkle or jam the packaging material. The flexible tubes may be compactly stored with minimum chance for interlocking. They also may be easily formed from materials of substantially uniform thickness such as those of thermoplastic composition. A relatively few number of grooves is required to effect permanent bends of selected angles.

It should be understood that the just described embodiment merely illustrate principles of the invention in one preferred form. Many modifications, additions and deletions may, of course, be made thereto without departure from the spirit and scope of the invention as set forth in the following claims.

I clam:

1. In a cylindrical drinking straw of thermoplastic material having a flexible zone intermediate and spaced from the ends thereof, and continuous smooth exterior portions between said flexible zone and each of said ends, said flexible zone being capable of being flexed without substantial springback, the improvement in said flexible zone comprising: a series of circumferential grooves disposed at spaced positions along a longitudinal axis of said drinking straw, each of said grooves being defined by an annular floor inboard of said continuous smooth exterior portions and two opposed convergently extending groove sidewalls, said groove sidewalls terminating on the exterior surface of said straw at positions in alignment with said continuous smooth exterior portions, and a plurality of smooth, annular regions interconnecting the side-walls of each adjacent groove, said smooth, annular regions having the same outside diameter as said continuous smooth exterior portions thereby providing a substantially smooth exterior surface of said straw from end to end.

2. The drinking straw of claim 1 wherein said annular groove floors are longer than said groove sidewalls.

3. The drinking straw of claim 1, wherein said annular floors and sidewalls are of a substantially uniform thickness.

4. The drinking straw of claim 1 wherein said straw has annular areas of reduced material thickness at the junction of said annular floors and sidewalls.

5. The drinking straw of claim 1 wherein said grooves have a substantially truncated, triangular cross-sectional configuration.

6. The drinking straw of claim 1 wherein each of said annular floors has a smooth inner surface facing the inside of said straw.

7. In a substantially cylindrical drinking straw of thermoplastic material having a flexible zone intermediate and spaced from the ends thereof, and continuous smooth exterior portions between said flexible zone and each of said ends, said flexible zone being capable of being flexed without substantial springback, the improvement in said flexible zone comprising:

a series of circumferential grooves with truncated, triangular cross sectional configurations, said grooves being disposed at spaced positions along a longitudinal axis of said drinking straw, each of said grooves being defined by an annular floor inboard of said continuous smooth exterior portions and two opposed convergently extending groove sidewalls, said groove sidewalls terminating on the exterior surface of said straw at positions in alignment with said continuous smooth exterior portions, a plurality of smooth annular regions interconnecting the sidewalls of each adjacent groove, said smooth annular regions having the same outside diameter as said continuous smooth exterior portions thereby providing a substantially smooth exterior surface of said straw from end to end, said annular floors being of the same thickness as said sidewalls but longer than said sidewalls, and annular areas of reduced material thickness only at the junctions of said annular floors and said sidewalls.

8. The drinking straw of claim 7 wherein each of said annular floors has a smooth inner surface facing the inside of said straw.

* * * * *